United States Patent
Shimamura et al.

(10) Patent No.: US 8,570,391 B2
(45) Date of Patent: Oct. 29, 2013

(54) IMAGING APPARATUS AND IMAGE PROCESSING METHOD USED IN IMAGING DEVICE

(75) Inventors: Shogo Shimamura, Hachioji (JP); Satoshi Miyazaki, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 320 days.

(21) Appl. No.: 12/637,788

(22) Filed: Dec. 15, 2009

(65) Prior Publication Data
US 2010/0157084 A1    Jun. 24, 2010

(30) Foreign Application Priority Data
Dec. 18, 2008   (JP) ................................. 2008-322804

(51) Int. Cl.
*H04N 5/235*    (2006.01)
*H04N 5/222*    (2006.01)
*G06K 9/00*     (2006.01)

(52) U.S. Cl.
USPC .................... 348/222.1; 348/333.12; 382/103

(58) Field of Classification Search
USPC ..................... 348/222.1; 382/298, 103, 157
See application file for complete search history.

(56) References Cited

U.S. PATENT DOCUMENTS

| | | | | |
|---|---|---|---|---|
| 5,850,470 | A * | 12/1998 | Kung et al. | 382/157 |
| 6,344,907 | B1 * | 2/2002 | Watanabe et al. | 358/448 |
| 8,031,961 | B2 * | 10/2011 | Nachlieli et al. | 382/254 |
| 8,107,771 | B2 | 1/2012 | Sako et al. | |
| 2004/0207743 | A1 * | 10/2004 | Nozaki et al. | 348/333.12 |
| 2004/0208114 | A1 | 10/2004 | Lao et al. | |
| 2004/0228528 | A1 | 11/2004 | Lao | |
| 2008/0013787 | A1 * | 1/2008 | Kobayashi | 382/103 |
| 2008/0023765 | A1 | 1/2008 | Jeon et al. | |
| 2008/0285817 | A1 | 11/2008 | Imamura | |
| 2009/0016645 | A1 * | 1/2009 | Sako et al. | 382/298 |

FOREIGN PATENT DOCUMENTS

| | | |
|---|---|---|
| CN | 101216881 A | 7/2008 |
| CN | 101272457 A | 9/2008 |
| JP | 2004-180114 A | 6/2004 |
| JP | 2004-222118 A | 8/2004 |
| JP | 2004-246456 A | 9/2004 |

(Continued)

OTHER PUBLICATIONS

Chinese Patent Office Action (SIPO), Application No. 200910261530.0, Mailed Oct. 8, 2011.

(Continued)

*Primary Examiner* — Joel Fosselman
(74) *Attorney, Agent, or Firm* — Brosemer, Kolefas & Associats, LLC

(57) ABSTRACT

An imaging apparatus includes an imaging unit that photoelectrically converts an object image to generate image data; a face detecting unit that detects a face in the generated image data; and a number-of-people detecting unit that detects the number of faces detected in the image data based on a face detection result by the face detecting unit. The imaging apparatus also includes a feature determining unit that determines a feature of the detected face based on a face detection result by the face detecting unit; a face selecting unit that selects a face that satisfies a predetermined correction condition set in advance among the detected faces based on at least one of a detection result of the number of people and a determination result of the feature; and a face-image processing unit that performs a predetermined correction process on at least the selected face.

4 Claims, 13 Drawing Sheets

| CORRECTION CONDITIONS | CORRECTION PROCESS CONTENTS | | | | | |
|---|---|---|---|---|---|---|
| | CORRECTION PROCESS A (SMOOTHING PROCESS) | CORRECTION PROCESS B (GLAZING PROCESS) | CORRECTION PROCESS C (WHITENING PROCESS) | CORRECTION PROCESS D (PROCESS TO WHITEN TEETH) | CORRECTION PROCESS E (PROCESS TO ENLARGE EYES) | |
| NUMBER-OF-PEOPLE SETTING INCLUDED | ○ | × | × | × | × | ... |
| FACE-SIZE SETTING INCLUDED | ○ | × | ○ | × | × | ... |
| GENDER SETTING INCLUDED (FEMALE) | ○ | ○ | ○ | × | ○ | ... ~R21 |
| ⋮ | ⋮ | ⋮ | ⋮ | ⋮ | ⋮ | ⋮ |
| AGE SETTING INCLUDED (THIRTIES) | ○ | × | ○ | × | × | ... |
| ⋮ | ⋮ | ⋮ | ⋮ | ⋮ | ⋮ | ⋮ |
| SMILE SETTING INCLUDED | × | × | × | ○ | × | ... ~R23 |
| ⋮ | ⋮ | ⋮ | ⋮ | ⋮ | ⋮ | |

(56) References Cited

FOREIGN PATENT DOCUMENTS

| | | | |
|---|---|---|---|
| JP | 2004-318205 | A | 11/2004 |
| JP | 2004-320285 | A | 11/2004 |
| JP | 2005-277772 | A | 6/2005 |
| JP | 2007-157176 | A | 6/2007 |
| JP | 2007-228233 | A | 6/2007 |
| JP | 2007-184683 | A | 7/2007 |
| JP | 2008-113262 | A | 5/2008 |
| JP | 2008-289189 | A | 11/2008 |

OTHER PUBLICATIONS

Office Action mailed Nov. 13, 2012 in counterpart Japanese Patent Application No. 2008-322804.

Office Action mailed May 31, 2012 in counterpart Chinese Patent Application No. 200910261530.0, with English translation of Examiner's comments.

Office Action mailed Aug. 21, 2012 in counterpart Japanese Patent Application No. 2008-322804.

* cited by examiner

FIG.9

| CORRECTION CONDITIONS | CORRECTION PROCESS A (SMOOTHING PROCESS) | CORRECTION PROCESS B (GLAZING PROCESS) | CORRECTION PROCESS C (WHITENING PROCESS) | |
|---|---|---|---|---|
| FIRST CORRECTION PROCESS | ○(○: PERFORMED) | ○ | ○ | ~R11 |
| SECOND CORRECTION PROCESS (1) | ○ | ×(×: NOT PERFORMED) | × | ~R13 |
| SECOND CORRECTION PROCESS (2) | × | × | × | ~R15 |

FIG.12

| CORRECTION CONDITIONS | CORRECTION PROCESS CONTENTS ||||||
|---|---|---|---|---|---|---|
| | CORRECTION PROCESS A (SMOOTHING PROCESS) | CORRECTION PROCESS B (GLAZING PROCESS) | CORRECTION PROCESS C (WHITENING PROCESS) | CORRECTION PROCESS D (PROCESS TO WHITEN TEETH) | CORRECTION PROCESS E (PROCESS TO ENLARGE EYES) | ... |
| NUMBER-OF-PEOPLE SETTING INCLUDED | ○ | × | × | × | × | ... |
| FACE-SIZE SETTING INCLUDED | ○ | × | ○ | × | × | ... |
| GENDER SETTING INCLUDED (FEMALE) | ○ | ○ | ○ | × | ○ | ... ~R21 |
| ... | ... | ... | ... | ... | ... | ... |
| AGE SETTING INCLUDED (THIRTIES) | ○ | × | ○ | × | × | ... |
| ... | ... | ... | ... | ... | ... | ... ~R23 |
| SMILE SETTING INCLUDED | × | × | × | ○ | × | ... |
| ... | ... | ... | ... | ... | ... | ... |

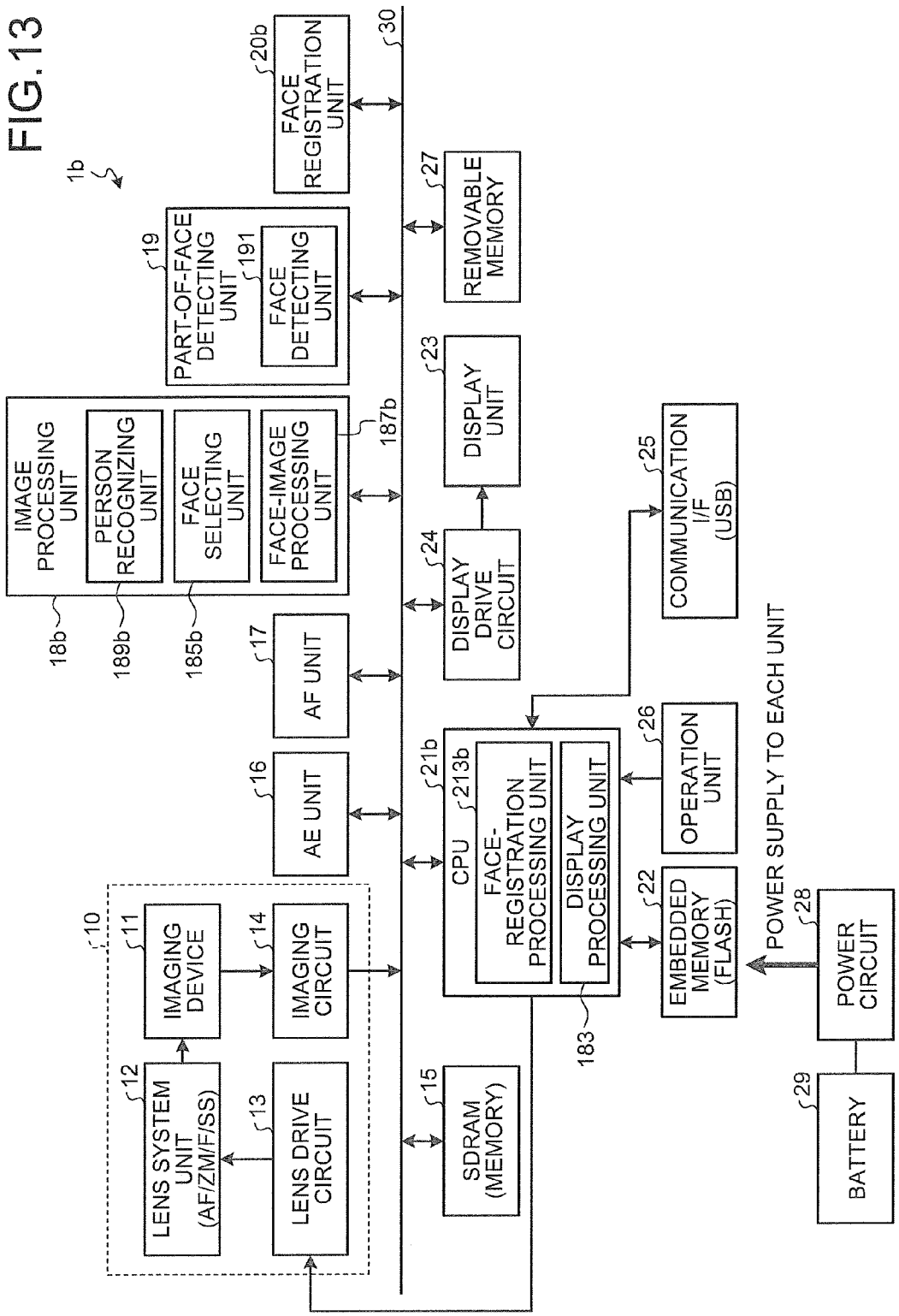

US 8,570,391 B2

IMAGING APPARATUS AND IMAGE PROCESSING METHOD USED IN IMAGING DEVICE

CROSS-REFERENCE TO RELATED APPLICATIONS

This application is based upon and claims the benefit of priority of the prior Japanese Patent Application No. 2008-322804, filed on Dec. 18, 2008, the entire contents of which are incorporated herein by reference.

BACKGROUND OF THE INVENTION

1. Field of the Invention

The present invention relates to an imaging apparatus and an image processing method used in the imaging apparatus.

2. Description of the Related Art

A face detection technology to detect the face of a person or the like that appears in images has been conventionally known. In an imaging apparatus, for example, a digital camera or the like, the face of an object is detected by using the face detection technology, and the result of the face detection is used in the control of exposure, focus, and the like.

On the other hand, a large variety of image processing technologies are proposed in which various correction processes are performed on the face of an object in accordance with the result of the face detection by using the face detection technology.

SUMMARY OF THE INVENTION

An imaging apparatus according to an aspect of the present invention includes an imaging unit that photoelectrically converts an object image to thereby generate image data; a face detecting unit that detects a face in the image data generated by the imaging unit; a number-of-people detecting unit that detects the number of faces detected in the image data based on a face detection result by the face detecting unit; a feature determining unit that determines a feature of the face detected in the image data based on a face detection result by the face detecting unit; a face selecting unit that selects a face that satisfies a predetermined correction condition set in advance among the detected faces based on at least one of a detection result by the number-of-people detecting unit and a determination result by the feature determining unit; and a face-image processing unit that performs a predetermined correction process on at least the face selected by the face selecting unit.

An image processing method according to another aspect of the present invention is used in an imaging apparatus that includes an imaging unit that photoelectrically converts an object image to generate image data. The image processing method includes detecting a face in the image data generated by the imaging unit; detecting the number of faces detected in the image data; determining a feature of a face detected in the image data; selecting a face that satisfies a predetermined correction condition set in advance based on at least one of the number of detected faces and the determined feature of the face; and performing a predetermined correction process on at least the selected face.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a diagram that explains the contents of a first correction process and a second correction process;

FIG. 12 is a diagram that illustrates examples of correction processes for each correction condition according to a modified example;

FIG. 13 is a block diagram that illustrates the system configuration of a digital camera according to a second embodiment.

DETAILED DESCRIPTION OF THE PREFERRED EMBODIMENTS

Figure 1:
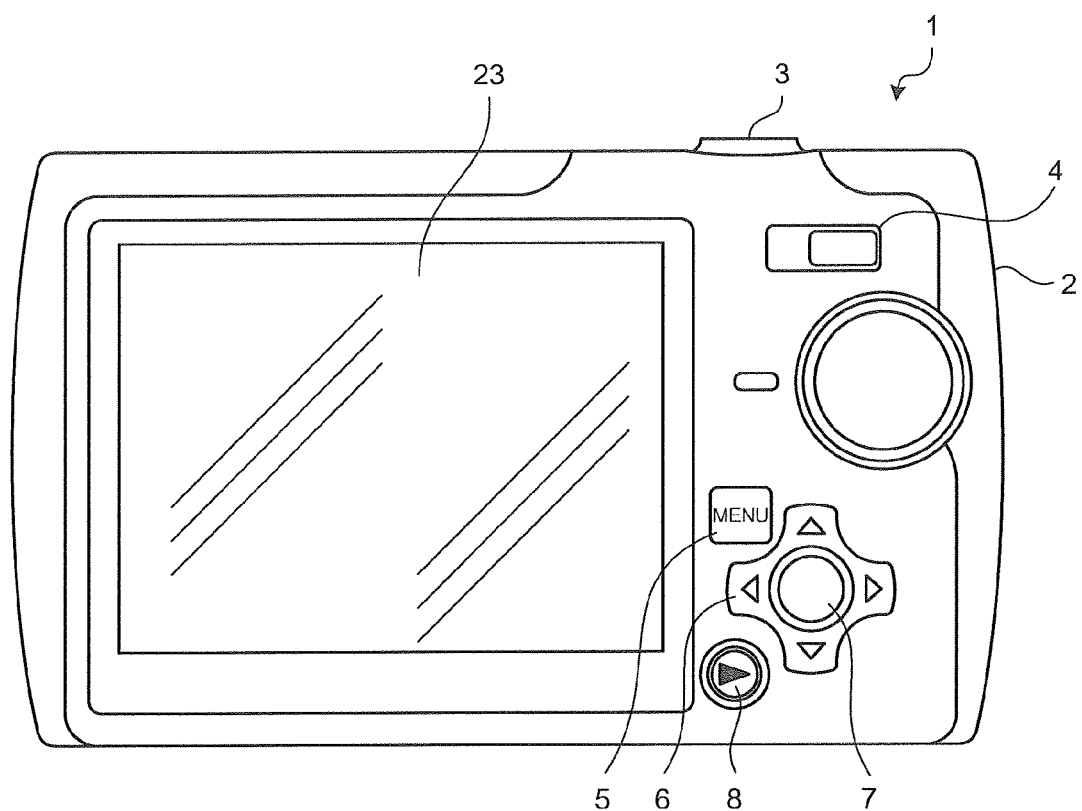
FIG. 1 is a rear view of a digital camera.

Exemplary embodiments of the present invention are explained in detail below with reference to the drawings. In the present embodiment, an explanation is given of, for example, the case where an imaging apparatus according to the present invention is applied to a digital camera. The present invention is not limited to these embodiments. For example, the present invention may be used for portable apparatuses such as mobile phones or game machines that include an imaging apparatus. In the descriptions of each of the drawings, the same components are indicated with the same reference numerals.

FIG. 1 is a rear view of a digital camera 1. As illustrated in FIG. 1, the digital camera 1 includes a release switch (shutter switch) 3, a power switch 4, a menu switch 5, a cross-shaped key 6, an OK switch 7, a reproduction switch 8, a display unit 23, and the like. The power switch 4, the menu switch 5, the cross-shaped key 6, the OK switch 7, the reproduction switch 8, and the display unit 23 are arranged on the rear of a camera main body 2. The release switch 3 is arranged on the top face of the camera main body 2 and is used for instructing shooting timing. For example, the release switch 3 is a two-step type press button. When the release switch 3 is pressed halfway, a first release switch is turned on, and when the release switch 3 is completely pressed, a second release switch is turned on. The power switch 4 is used for input to switch the power-on/power-off of the digital camera 1. For example, the power switch 4 is implemented by using a slide switch. The cross-shaped key 6 includes switches (the up switch, the down switch, the left switch, and the right switch) in each direction from right to left and up and down. The OK switch 7 is used for deciding operation contents, or the like. The reproduction switch 8 is used for switching between the shooting mode and the reproduction mode. The display unit 23 displays various types of screens. Although not illustrated, a flash, an imaging lens and the like are arranged on the front face of the camera main body 2.

In the digital camera 1, when the power-on is instructed by sliding the power switch 4, the digital camera 1 enters the state where the shooting is possible (the shooting mode). During the shooting mode, an object image that enters via the imaging lens is output frame by frame (for example, 1/30 second) and is displayed in real time on the display unit 23 as a live-view image. The user presses the release switch 3 while watching the live-view images, thereby shooting still images or moving images. Meanwhile, upon the power-on, the shooting mode and the reproduction mode are switched over in accordance with a press operation of the reproduction switch 8. During the reproduction mode, the user enjoys the still images or the moving images shot by the digital camera 1 while the still images or the moving images are displayed (reproduced) on the display unit 23.

Figure 2:
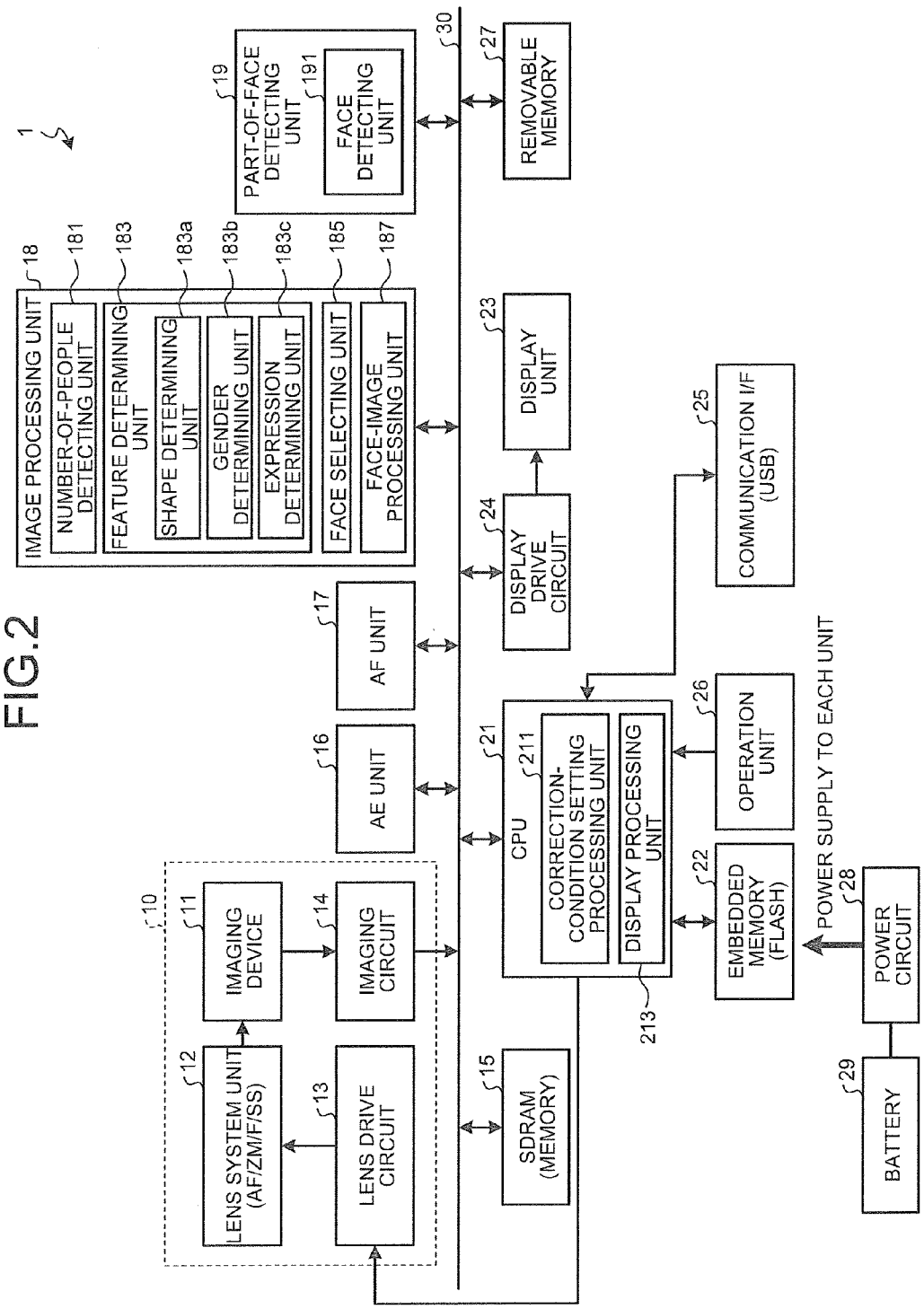
FIG. 2 is a block diagram that illustrates the system configuration of the digital camera according to a first embodiment.

FIG. 2 is a block diagram that illustrates the system configuration of the digital camera 1. As illustrated in FIG. 2, the digital camera 1 includes an imaging element 11, a lens system unit 12, a lens drive circuit 13, an imaging circuit 14, a synchronous dynamic random access memory (SDRAM) 15, an AE unit 16, an AF unit 17, an image processing unit 18, a part-of-face detecting unit 19, a CPU 21, an embedded memory 22, the display unit 23, a display drive circuit 24, a communication I/F 25, an operation unit 26, a removable memory 27, a power circuit 28, and a battery 29. It is configured such that the imaging circuit 14, the SDRAM 15, the AE unit 16, the AF unit 17, the image processing unit 18, the part-of-face detecting unit 19, the CPU 21, the display drive circuit 24, and the removable memory 27 are connected to one another via a bus 30. The imaging element 11, the lens system unit 12, the lens drive circuit 13, and the imaging circuit 14 constitute an imaging unit 10 that photoelectrically converts an object image thereby generating image data of a shot image.

The imaging element 11 is, for example, an image sensor such as a charge coupled device (CCD) or a complementary metal oxide semiconductor (CMOS) and photoelectrically converts an object image, which enters via the lens system unit 12, in units of frame, thereby outputting an analog electric signal. The lens system unit 12 includes imaging lenses that include a lens for auto-focus (AF), a lens for zoom and the like, an aperture, a shutter, and the like, and the lens drive circuit 13 drives the lens system unit 12.

The imaging circuit 14 performs analog signal processing, such as correlated double sampling (CDS) or automatic gain control (AGC), on an analog electric signal output from the imaging element 11. Afterwards, the imaging circuit 14 converts it into a digital electric signal, performs digital signal processing, such as a pixel interpolation process or a color correction process, on the digital electric signal, and outputs it as image data. The image data is temporarily stored in the SDRAM 15.

The SDRAM 15 is used for temporarily storing therein image data output from the imaging circuit 14, image data being processed by the image processing unit 18, and the like. For example, the SDRAM 15 temporarily stores therein image data (live-view image) of an image output from the imaging circuit 14 frame by frame, image data (hereinafter, referred to as "shot image" as appropriate) of an image output from the imaging circuit 14 in the shooting timing, and the like. During the shooting mode, or the like, that is one of the modes of the digital camera 1, an object image formed by the imaging element 11 is displayed in real time on the display unit 23 like a moving image, and the live-view image means this image.

The AE unit 16 performs automatic exposure on the basis of image data output from the imaging circuit 14. The AF unit 17 performs automatic focusing on the basis of image data output from the imaging circuit 14.

The image processing unit 18 performs various types of image processing on image data output from the imaging circuit 14 and performs processing to convert the image data into image data suitable for storage, display, or the like. For example, when image data of shot images is to be stored or when the stored image data is to be displayed, the image processing unit 18 performs a compression process or an expansion process on image data in accordance with a Joint Photographic Experts Group (JPEG) system, or the like. Furthermore, if needed, the image processing unit 18 performs various types of image processing on image data, such as a resizing process to enlarge or reduce image data by increasing or decreasing the number of pixels, a trimming process to extract a part of image data, a brightness adjustment process or a color adjustment process to adjust brightness components or color components of each pixel, or a transparency process.

The image processing unit 18 includes a number-of-people detecting unit 181, a feature determining unit 183, a face selecting unit 185, and a face-image processing unit 187. The digital camera 1 according to a first embodiment has a correction mode to correct a face in a shot image as one of the shooting modes. If the correction mode is set, the number-of-people detecting unit 181 detects the number of detected faces in accordance with a face detection result in a live-view image or a shot image by the part-of-face detecting unit 19.

If the correction mode is set, the feature determining unit 183 determines the features of the detected face in accordance with the face detection result in the live-view image or the shot image by the part-of-face detecting unit 19. The feature determining unit 183 includes a shape determining unit 183a, a gender determining unit 183b, and an expression determining unit 183c. The shape determining unit 183a determines, on the basis of the shape of the face detected by the part-of-face detecting unit 19, the size of the face. The gender determining unit 183b determines (assumes) the gender by using a well-known method in accordance with a detection result of a face or each facial part detected by the part-of-face detecting unit 19. Moreover, the expression determining unit 183c determines whether the expression is a smile by using a well-known method (as disclosed in United States Patent Publication No. 2008/0273765, for example) in accordance with a detection result of a face or each facial part detected by the part-of-face detecting unit 19. Furthermore, in addition to the shape of the face, the gender, and the expression, the feature determining unit 183 determines (assumes) the age by using a well-known method in accordance with a detection result of a face or each facial part detected by the part-of-face detecting unit 19.

The face selecting unit 185 selects, as a correction target, a face that satisfies the correction conditions set in advance by the user operation in accordance with the detection result by the number-of-people detecting unit 181 and the determination result by the feature determining unit 183. The face-image processing unit 187 performs predetermined image processing (hereinafter, referred to as "correction process")

to process the face area of the face in the live-view image or the shot image selected by the face selecting unit 185.

The part-of-face detecting unit 19 includes a face detecting unit 191 that detects, on the basis of image data of the shot image, an area (face area) of the face in the image data by applying pattern matching that is a well-known technology. The part-of-face detecting unit 19 detects each facial part, such as eyes, nose, lips, and the like, in accordance with the detection result of the face area by the face detecting unit 191. Data such as positional coordinates of the face area or positional coordinates of each part detected in an image of a person is stored in the SDRAM 15.

The CPU 21 reads and executes a camera program from the embedded memory 22 in accordance with an operation signal, or the like, from the operation unit 26 and sends instruction or data to each unit that constitutes the digital camera 1, thereby performing overall control of the operation of the digital camera 1. For example, the CPU 21 determines a shot image (the shot image after the correction process if the correction process has been performed) as a stored image and performs the process to store the image data of the stored image in the removable memory 27. Furthermore, the CPU 21 includes a display processing unit 213 and performs the process to display the live-view image, the confirmation image (REC view), and the stored image on the display unit 23.

Moreover, the CPU 21 includes a correction-condition setting processing unit 211. The correction-condition setting processing unit 211 receives an input operation of a correction condition by the user via the operation unit 26 and sets the correction condition in accordance with the input contents. The face selecting unit 185 of the image processing unit 18 selects a face that satisfies the set correction condition as a correction target.

The embedded memory 22 is, for example, a nonvolatile memory such as a flash memory that is electrically rewritable. The embedded memory 22 stores therein in advance various types of camera programs to operate the digital camera 1 and perform various functions included in the digital camera 1 and data to be used when a camera program is being executed, and the like. A recording medium in which the camera programs and the data to be used when the camera program is being executed are stored is not limited to a flash memory. For example, an optical recording medium such as a CD-ROM or a DVD-ROM, a magnetic recording medium such as an MD, a tape medium, or a semiconductor memory such as an IC card can be used.

The display unit 23 is used for displaying various types of setting information of the digital camera 1, or the like, in addition to shot images and live-view images and is implemented by a display device such as a liquid crystal display (LCD) or an electroluminescence display (EL display). The display drive circuit 24 drives the display unit 23. In the display unit 23, the live-view images are re-rendered and continuously displayed like moving images at a predetermined display frame rate during the shooting mode, and the shot images are displayed during the reproduction mode.

The operation unit 26 is used for receiving various types of user operations, such as the instruction of the shooting timing, the setting operation of various types of modes such as the shooting mode and the reproduction mode including the correction mode, and the setting operation of shooting conditions, and notifying the CPU 21 of operation signals. The operation unit 26 is implemented by a button switch, a slide switch, a dial, and the like, to which various types of functions are assigned. The operation unit 26 includes the release switch 3, the power switch 4, the menu switch 5, the cross-shaped key 6, the OK switch 7, and the reproduction switch 8, as illustrated in FIG. 1.

The communication I/F 25 is an interface for connecting the digital camera 1 to an external device, for example, a personal computer, or the like, by a communication standard, for example, a Universal Serial Bus (USB), or the like.

The removable memory 27 is a memory card, for example, the xD-Picture Card (registered trademark), the Compact-Flash (registered trademark) card or the like that is removable from the digital camera 1. Image data of shot images is written in the removable memory 27 by an undepicted reading/writing device depending on its type, or the image data stored in the removable memory 27 is read by the reading/writing device.

The power circuit 28 converts the electric power fed from the loaded battery 29 into a predetermined electric power and feeds it to each unit of the digital camera 1.

An explanation will be given of the outline of the correction mode that is one of the functions of the digital camera 1 configured as described above. In the first embodiment, if the correction mode is set as the setting relating to the shooting mode, the digital camera 1 performs the correction process on an area of a face or each facial part that constitutes the face.

The correction process is a process to finely express the face of an object such as a person. Although the contents of the correction process are not particularly limited, for example, it includes a smoothing process to process a skin for smoothness, a whitening process to process a skin for whitening, a catchlight process to combine eyes with the catchlight, a glazing process to adjust the brightness and color of lips thereby generating glaze and appearance of solidity, and the like. In the smoothing process, for example, the process to detect an area of a wrinkle or fleck in the skin area and replace it with the state of the surrounding skin is performed. In the whitening process, for example, the process to detect any reddish areas of the skin and replace them with the color of the surrounding skin, the process to increase the whiteness of the skin, or the process to correct the skin to have a suntanned color is performed. In addition to the exemplified correction processes, for example, it is possible to perform a correction to adjust the opening degree of the eyes thereby making the eyes look bigger. These correction processes can be performed by using the well-known technologies disclosed in Japanese Laid-open Patent Publication No. 2004-180114, United States Patent Publication No. 2004/0208114, Japanese Laid-open Patent Publication No. 2004-318205, and the like. The correction processes are not limited to the well-known technologies disclosed in these documents, and a correction process can be selectively used as appropriate if needed. Furthermore, it is possible that one of the correction processes is performed or a plurality of them is performed in combination.

It requires a certain amount of time to perform the above various correction processes on the shot image. Therefore, if the user has performed the shooting with the correction mode selected, the user needs to wait until each of the correction processes has finished. Therefore, in the first embodiment, the correction conditions are set in advance in accordance with the user operation, and the correction processes are performed on only a face that satisfies the correction conditions, whereby the processing time is reduced.

Figure 3:
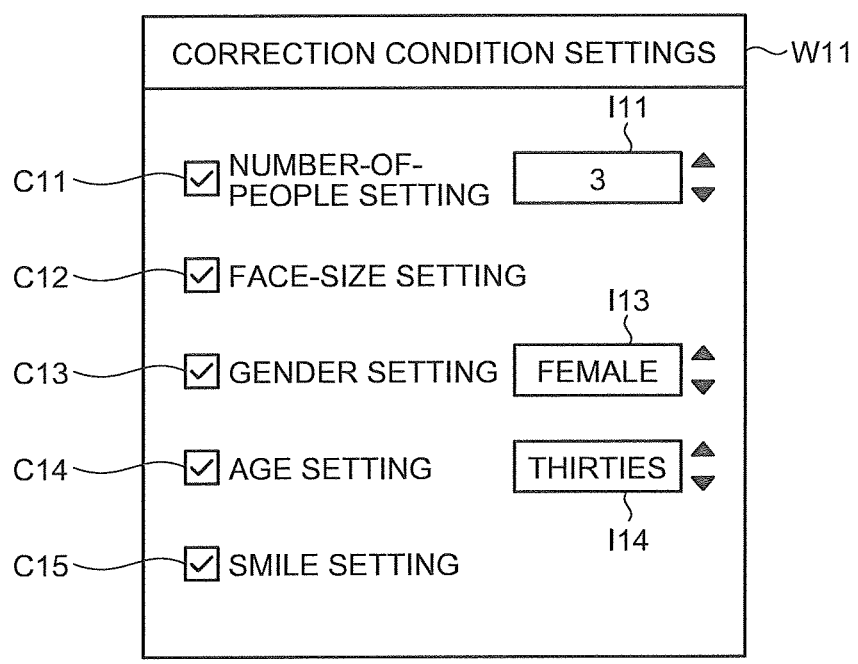
FIG. 3 is a diagram that illustrates an example of a correction-condition setting screen that provides notification of a setting request for correction conditions.

FIG. 3 is a diagram that illustrates an example of a correction-condition setting screen W11 that provides notification of a setting request for the correction conditions. In the digital camera 1 according to the first embodiment, for example, if the menu switch 5 is pressed, various types of setting menus are displayed. The correction-condition setting screen is displayed if, for example, a correction-process setting menu that is one of the setting menus is selected. For example, five kinds of correction conditions, i.e., the number-of-people setting, the face-size setting, the gender setting, the age setting, and the smile setting, are displayed on the correction-condition setting screen W11 illustrated in FIG. 3. Check boxes C11 to C15 to set the corresponding correction conditions are arranged. The user checks the check boxes C11 to C15 that correspond to desired correction conditions, thereby setting the correction conditions.

The number-of-people setting is used for setting the number of faces included in an image as the correction condition. If the check box C11 for the number-of-people setting is checked and if the number of faces included in the image is equal to or smaller than the number (three in this example) input to a corresponding input box I11, the correction process is performed on each of the faces as a correction target. If the number of faces larger than the value input to the input box I11 is included in the image, the correction process is not performed. The number in the input box I11 can be variably set by operating, for example, the up switch or the down switch of the cross-shaped key 6. The number of faces that is the correction condition can be a fixed value.

The face-size setting is used for setting the size of a face, which is a target for the correction process, as the correction condition. If the check box C12 for the face-size setting is checked, the correction process is performed on a face whose face area has a size equal to or larger than a predetermined face size among the faces included in the image. The predetermined face size is fixedly defined in advance. For example, in the first embodiment, the predetermined face size is set in advance such that the correction process is performed on a face in which the short side of the face area is equal to or larger than one fifth of the short side of the image. The predetermined face size is one example and can be set as appropriate. Furthermore, it is possible to have a configuration such that the predetermined face size is variably set in accordance with the user operation.

The gender setting is used for setting the gender as the correction condition. If the check box C13 for the gender setting is checked, the correction process is performed on the face whose assumed gender is the gender (the female gender in this example) input to a corresponding input box I13 among the faces included in the image. Meanwhile, the correction process is not performed on the face whose gender is assumed to be of masculine gender. The gender input to the input box I13 can be variably set by operating, for example, the up switch or the down switch of the cross-shaped key 6. The gender that is the correction condition can be a fixed value.

The age setting is used for setting the age (the age group in this example) as the correction condition. If the check box C14 for the age setting is checked, the correction process is performed on the face whose assumed age is included in the age group (thirties in this example) input to a corresponding input box I14 among the faces included in the image. The age group input to the input box I14 can be variably set by operating, for example, the up switch or the down switch of the cross-shaped key 6. The age (age group) that is the correction condition can be a fixed value.

The smile setting is used for setting as to whether the facial expression is a smile as the correction condition. If the check box C15 for the smile setting is checked, the correction process is performed on the face whose expression is a smile among the faces included in the image.

Figure 4:
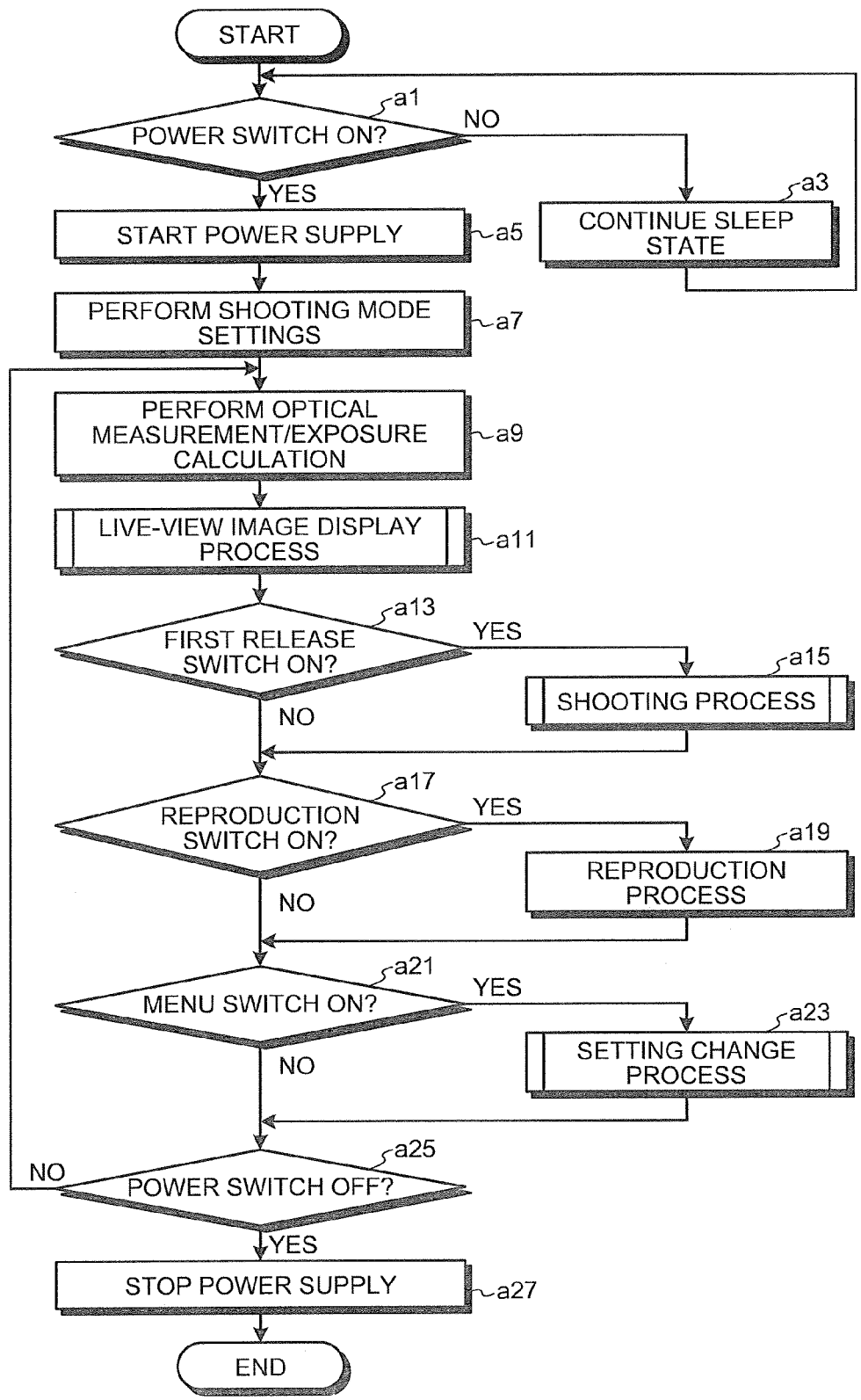
FIG. 4 is a flowchart that illustrates the basic operation of the digital camera.

Next, an explanation will be given of the operation of the digital camera 1. FIG. 4 is a flowchart that illustrates the basic operation of the digital camera 1. As illustrated in FIG. 4, the digital camera 1 is in the stand-by state until the power switch 4 is slid so that the power-on (power switch ON) is instructed, and while the power switch is turned off (step a1: No), the digital camera 1 continues to be in the sleep state (step a3) and the process control goes back to step a1.

When the power switch is turned on (step a1: Yes), the supply of power to each unit by the power circuit 28 is started (step a5), and, first, the shooting mode setting is performed (step a7). Various types of settings relating to the shooting mode, for example, the settings relating to optical measurement or exposure calculation, the settings relating to the AE/AF operations, and the like are performed. In the first embodiment, at that time, if a face is detected in the shot image, the operation settings for the correction mode to perform the correction process on the face area are performed. Afterwards, optical measurement/calculation processes are performed (step a9).

Then, the process shifts to a live-view image display process (step a11). Because of the live-view image display process, image data of the object image formed by the imaging element 11 is temporarily stored in the SDRAM 15 and displayed on the display unit 23 as a live-view image. At that time, if the correction mode is set and if a face is included in the live-view image, the live-view image in which the face has been corrected is displayed on the display unit 23. The live-view image is updated and displayed at a predetermined frame rate and continuously displayed like a moving image.

Figure 5:
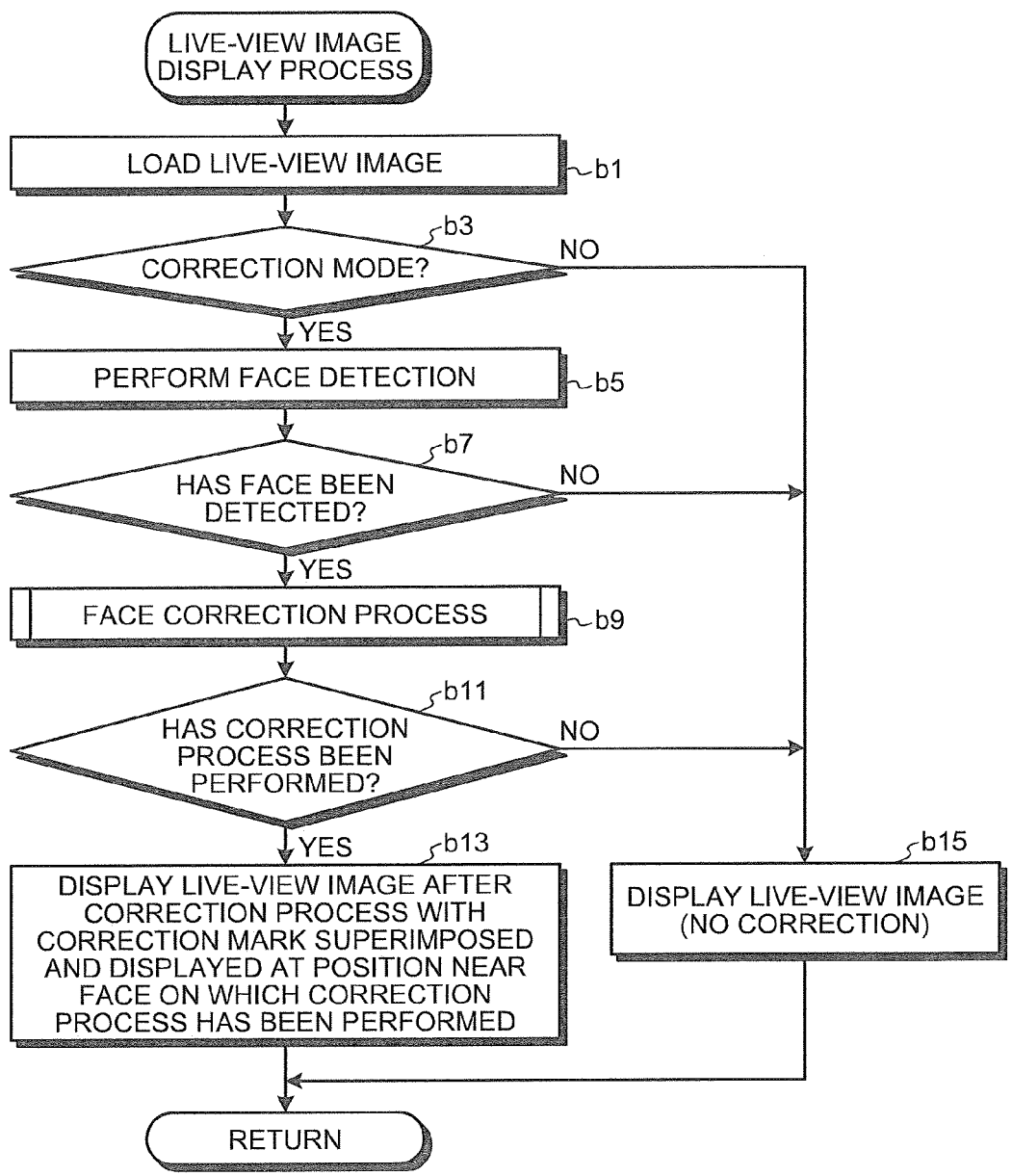
FIG. 5 is a flowchart that illustrates the detailed procedure of a live-view image display process.

FIG. 5 is a flowchart that illustrates the detailed procedure of the live-view image display process. As illustrated in FIG. 5, the live-view image is first loaded in the live-view image display process (step b1). Then, the CPU 21 determines whether the correction mode is set. If the correction mode is not set (step b3: No), the process control proceeds to step b15, and the display processing unit 213 performs the process to display the live-view image loaded at step b1 on the display unit 23. Afterwards, the live-view image display process is terminated and the process control proceeds to step a13 illustrated in FIG. 4.

If the correction mode is set (step b3: Yes), the part-of-face detecting unit 19 performs the face detection (step b5). Specifically, the part-of-face detecting unit 19 detects the face area from the shot image by using the face detecting unit 191 and detects each facial part in the face area in accordance with the detection result of the face area.

Afterwards, the CPU 21 determines whether the face has been detected by the face detection at step b5 and, if the face has not been detected (step b7: No), the process control proceeds to step b15, and the display processing unit 213 performs the process to display the live-view image loaded at step b1 on the display unit 23. Then, the live-view image display process is terminated and the process control proceeds to step a13 illustrated in FIG. 4.

If the face has been detected (step b7: Yes), the process shifts to a face correction process (step b9) and the correction process to correct the face with respect to the loaded live-view image is performed. In the face correction process, which will be described in details later, the number of faces detected in the live-view image is detected and the features of the face detected in the live-view image are determined. Then, in accordance with the detection result and the determination result, a face that satisfies the correction conditions set in advance by the procedure explained with reference to FIG. 3 is selected as a correction target and the correction process is performed. If no face that satisfies the correction conditions is present, the correction process is not performed and the face correction process is terminated.

The CPU 21 then determines whether the correction process has been actually performed on the face in the live-view image in the face correction process at step b9. If the correction process has not been performed (step b11: No), the process control proceeds to step b15, and the display processing unit 213 performs the process to display the live-view image loaded at step b1 on the display unit 23. Afterwards, the live-view image display process is terminated and the process control proceeds to step a13 illustrated in FIG. 4. If the correction process has been performed (step b11: Yes), the image processing unit 18 performs the process to superimpose and display (On Screen Display: OSD) a correction mark prepared as a template in advance at a position near the face that has been selected as the correction target and on which the correction process has been performed in the face correction process at step b9. Then, the display processing unit 213 performs the process to display, on the display unit 23, the live-view image after the correction process on which the correction mark is superimposed and displayed (step b13). Afterwards, the live-view image display process is terminated and the process control proceeds to step a13 illustrated in FIG. 4.

If the above live-view image display process is terminated, as illustrated in FIG. 4, the process then branches in accordance with the operation input. Specifically, if the release switch 3 is pressed to one step so that the first release switch is turned on (step a13: Yes), the shooting process is performed (step a15). If the first release switch is not turned on (step a13: No), the process control proceeds to step a17.

If the reproduction switch 8 is turned on (step a17: Yes), the reproduction mode is set and the reproduction process is performed (step a19). For example, the display processing unit 213 performs the process to read the shot image that is the stored image or the shot image after the correction process from the removable memory 27 and performs the process to display the read stored image on the display unit 23 for reproduction. The reproduction of the stored images can be configured such that, for example, image data of the stored images shot in the past and stored in the removable memory 27 is sequentially read and displayed one by one in the order of the shooting. Alternatively, it is possible to have a configuration such that the process to read thumbnail data of a plurality of stored images and display it as a list is performed and the image data of the stored image selected from the list in accordance with the user operation is displayed. If a switch operation of the stored image being reproduced is input, for example, by turning on the cross-shaped key 6, the display processing unit 213 performs the process to read the designated stored image from the removable memory 27 and display it on the display unit 23. If the reproduction switch 8 is not turned on (step a17: No), the process control proceeds to step a21.

If the menu switch 5 is turned on (step a21: Yes), a setting change process is performed (step a23). If the menu switch 5 is not turned on (step a21: No), the process control proceeds to step a25.

The process control returns to step a9 and the above-described process is performed until the power switch 4 is slid so that the power-off (the power switch OFF) is instructed (step a25: No). If the power switch 4 is turned off (step a25: Yes), the supply of power to each unit by the power circuit 28 is stopped (step a27), and the basis operation is terminated.

Figure 6:
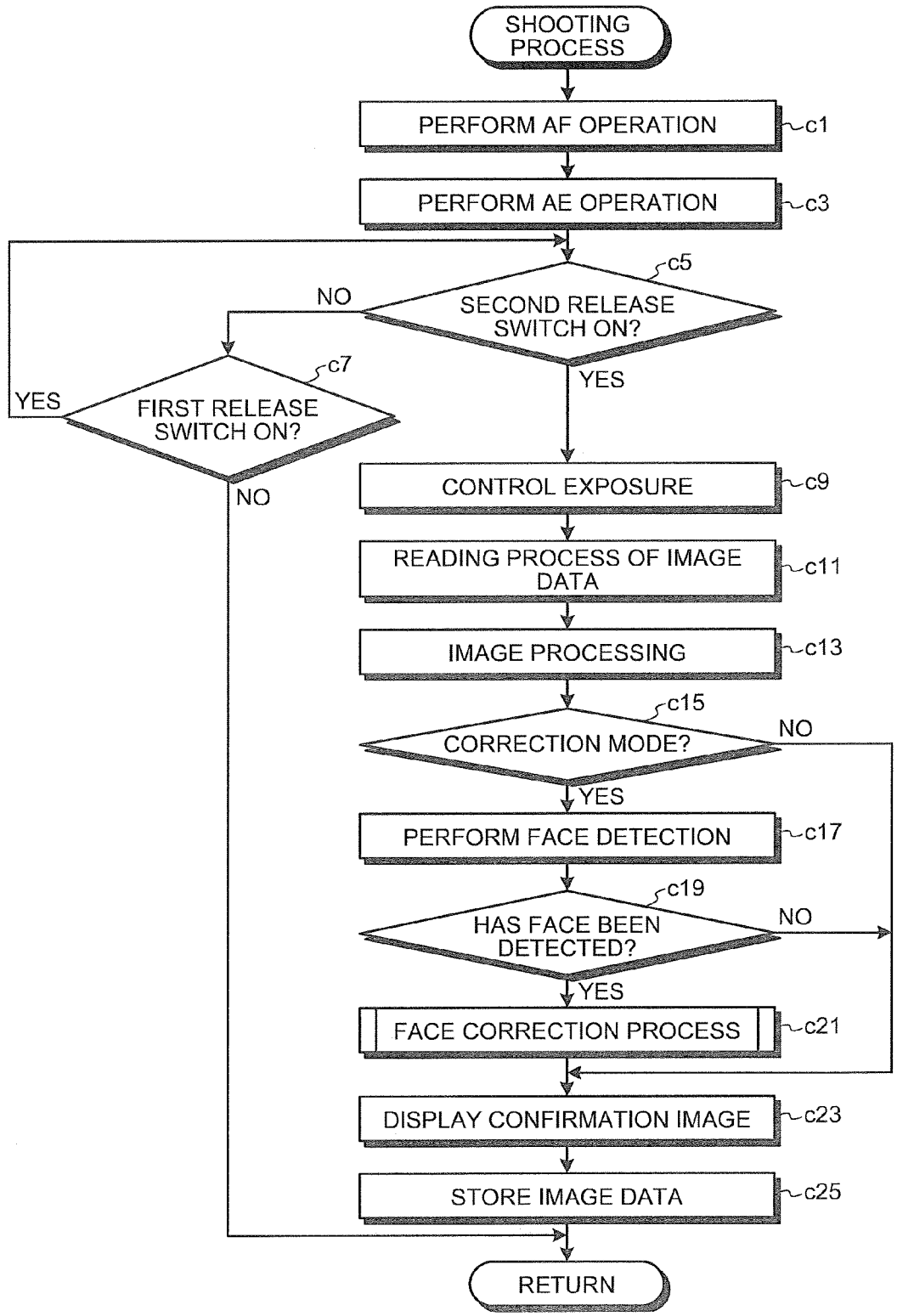
FIG. 6 is a flowchart that illustrates the detailed procedure of a shooting process.

Next, an explanation will be given of the shooting process (step a15) performed if the first release switch is turned on in the basis operation illustrated in FIG. 4. FIG. 6 is a flowchart that illustrates the detailed procedure of the shooting process. As illustrated in FIG. 6, in the shooting process, as a shooting preparation operation, first the AF unit 17 performs the AF (auto-focus) operation (step c1) and the AE unit 16 performs the AE (auto-exposure) operation (step c3).

Afterwards, the stand-by state is maintained while the second release switch is not turned on (step c5: No) and the first release switch remains to be turned on (step c7: Yes). If the first release switch is turned off (step c7: No), the shooting process is terminated and the process control proceeds to step a11 illustrated in FIG. 4.

If the release switch 3 is pressed to two steps so that the second release switch is turned on (step c5: Yes), the CPU 21 controls the exposure upon the shooting by driving the imaging unit 10 (step c9) and performs the process to read image data (step c11). Because of this process, the image within the shooting range at a timing in which the second release switch is turned on is generated as a shot image and its image data is temporarily stored in the SDRAM 15.

Then, the image processing unit 18 performs image processing necessary for the shot image (step c13). The CPU 21 then determines whether the correction mode is set. If the correction mode is not set (step c15: No), the process control proceeds to step c23. If the correction mode is set (step c15: Yes), the part-of-face detecting unit 19 performs the face detection (step c17). Specifically, the part-of-face detecting unit 19 detects the face area from the shot image by using the face detecting unit 191 and detects each facial part in the face area in accordance with the detection result of the face area.

Afterwards, the CPU 21 determines whether the face has been detected by the face detection at step c17 and, if the face has not been detected (step c19: No), the process control proceeds to step c23. If the face has been detected (step c19: Yes), the process shifts to the face correction process (step c21), and image processing to correct the face with respect to the shot image is performed. In the face correction process, in the same manner as the face correction process for the live-view image explained at step b9 illustrated in FIG. 5, a face that satisfies the correction conditions is selected as a correction target on the basis of the number of faces detected in the shot image and the features thereof and the correction process is performed. If no face that satisfies the correction conditions is present, the correction process is not performed and the face correction process is terminated. Afterwards, the process control proceeds to step c23.

At step c23, the display processing unit 213 performs the process (REC view) to display a confirmation image on the display unit 23. The REC view is a display for confirmation in order to display to the user the contents of the stored image that is generated as a result of the shooting and stored in the removable memory 27. The face on which the correction process has been actually performed in the face correction process at step c21 is sometimes not present if the correction mode is not set, if the face is not detected in the shot image although the correction mode is set, if the face in the shot image does not satisfy the correction conditions, or the like. In such a case, the shot image on which usual image processing has been performed at step c13 is displayed on the display unit 23 as a confirmation image. On the other hand, if the correction process has been performed on the face in the shot image in the face correction process at step c21, the shot image after the correction process is displayed on the display unit 23 as the confirmation image. At that time, in the same manner as the display of the live-view image explained at step b13 illustrated in FIG. 5, it is possible to perform the process of superimposing and displaying the correction mark at a position near the face that has been selected as a correction target and on which the correction process has been performed in the face correction process at step c21.

The CPU 21 then stores the image data of the shot image (the shot image after the correction process if the correction process has been performed) as the stored image in the removable memory 27 (step c25). Afterwards, the process control proceeds to step a11 illustrated in FIG. 4. It is possible to have a configuration such that, when the shot image after the correction process is stored, the image data of the original shot image (original image) before the correction process is stored in association with the image data of the shot image after the correction process. Furthermore, it is possible to have a configuration such that, if the correction mark is superimposed and displayed on the confirmation image, the data on the correction mark or its display position is also stored as additional information.

Figure 7:
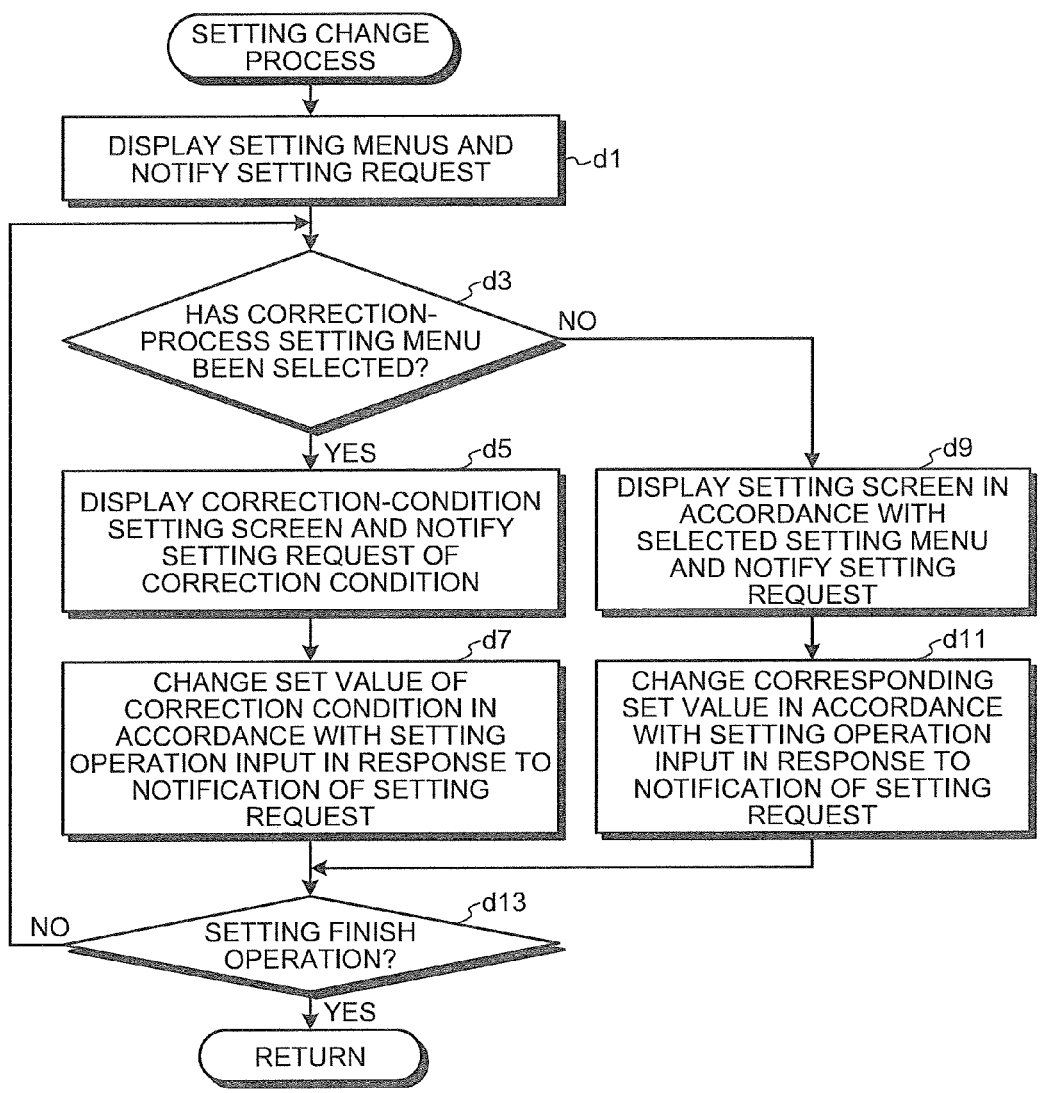
FIG. 7 is a flowchart that illustrates the detailed procedure of a setting change process.

Next, an explanation will be given of the setting change process (step a23) performed if the menu switch 5 is turned on in the basic operation illustrated in FIG. 4. FIG. 7 is a flowchart that illustrates the detailed procedure of the setting change process.

As illustrated in FIG. 7, in the setting change process, the CPU 21 first performs the process of presenting various types of setting menus thereby displaying notification of a setting request on the display unit 23 (step d1). The CPU 21 then performs the setting change process in accordance with the selected setting menu.

At that time, if the correction-process setting menu has been selected (step d3: Yes), the correction-condition setting processing unit 211 performs the process of displaying the correction-condition setting screen on the display unit 23, thereby providing notification of the setting request of the correction conditions (step d5). Then, the correction-condition setting screen illustrated in FIG. 3 is displayed so that the setting operation for each correction condition, for example, the number-of-people setting, the face-size setting, the gender setting, the age setting, the smile setting, or the like, is input by the user. The correction-condition setting processing unit 211 then performs the process of changing the set value of the correction condition in accordance with the setting operation input in response to the notification of the setting request (step d7). The changed set value (information indicating which item is selected as the correction condition among the number-of-people setting, the face-size setting, the gender setting, the age setting, and the smile setting) of the correction condition is updated and stored in the embedded memory 22. Afterwards, the process control proceeds to step d13.

If the setting menu other than the correction-process setting menu has been selected (step d3: No), the CPU 21 performs the process of displaying the setting screen in accordance with the selected setting menu on the display unit 23 thereby providing notification of the setting request (step d9). The CPU 21 then performs the process to change the corresponding set value in accordance with the setting operation input in response to the notification of the setting request (step d11). Because of this process, for example, the settings of the shooting condition and various types of settings relating to the shooting mode and the reproduction mode can be changed, and, for example, the setting as to whether the correction mode is selected as the shooting mode can be changed (switched). Afterwards, the process control proceeds to step d13.

At step d13, it is determined whether the setting finish operation has been input. If the setting finish operation has not been input (step d13: No), the process control goes back to step d3. If the setting finish operation has been input (step d13: Yes), the setting change process is terminated and the process control proceeds to step a25 illustrated in FIG. 4.

Figure 8:
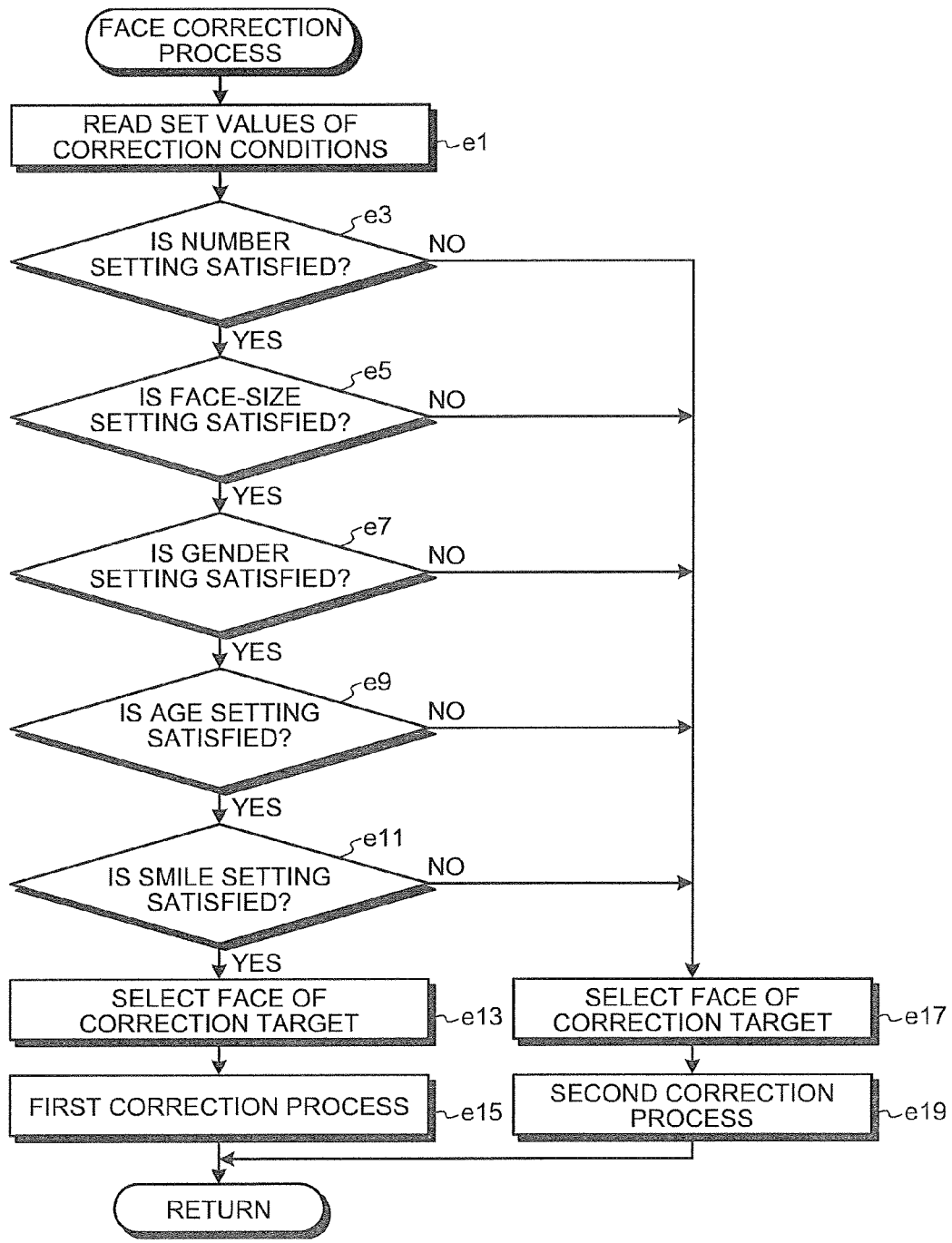
FIG. 8 is a flowchart that illustrates the detailed procedure of a face correction process according to the first embodiment.

Next, an explanation will be given of the face correction process performed at step b9 illustrated in FIG. 5 or step c21 illustrated in FIG. 6. FIG. 8 is a flowchart that illustrates the detailed procedure of the face correction process according to the first embodiment. The face correction process is performed as a process with respect to the live-view image at step b9 illustrated in FIG. 5 and is performed as a process with respect to the shot image at step c21 illustrated in FIG. 6.

As illustrated in FIG. 8, in the face correction process, the set values of the correction conditions are first read from the embedded memory 22 (step e1). Then, the process at step e3 to step e13 is performed in accordance with the face detection result performed on the live-view image at step b5 illustrated in FIG. 5 or the face detection result performed on the shot image at step c17 illustrated in FIG. 6, whereby a face that satisfies the set correction conditions is selected from the detected faces.

First, the number-of-people detecting unit 181 detects the number of faces detected as a result of the face detection and determines whether the number of detected faces satisfies the number setting. For example, in the example of the correction-condition setting screen illustrated in FIG. 3, if the number of detected faces is equal to or less than 3, it is determined that the number setting is satisfied. If the number setting is satisfied (step e3: Yes), the process control proceeds to step e5. Furthermore, if the number setting is not set as the correction condition, the process control proceeds to step e5. If the number setting is not satisfied (step e3: No), the process control proceeds to step e17.

At step e5, the shape determining unit 183a then determines the size of the face on the basis of the shape of the face (face area) detected as a result of the face detection and determines whether the face-size setting is satisfied. In the first embodiment, among the detected faces, it is determined that the face-size setting is satisfied with respect to a face in which the short side of the face area is equal to or larger than one fifth of the short side of the image (the live-view image or the shot image). If the face-size setting is satisfied (step e5: Yes), the process control proceeds to step e7. Furthermore, if the face-size setting is not set as the correction condition, the process control proceeds to step e7. It is possible to have a configuration such that, if all of the detected faces have a size equal to or larger than the predetermined face size, it is determined that the face-size setting is satisfied. If the face-size setting is not satisfied (step e5: No), the process control proceeds to step e17.

At step e7, the gender determining unit 183b then performs the process to assume the gender in accordance with the detection result of the detected face and each facial part. For example, in the example of the correction-condition setting screen illustrated in FIG. 3, if the detected faces include a face whose gender is assumed to be of female gender, it is determined that the gender setting is satisfied. If the gender setting is satisfied (step e7: Yes), the process control proceeds to step e9. If the gender setting is not set as the correction condition, the process control proceeds to step e9. It is possible to have a configuration such that, if all of the detected faces satisfy the gender setting, it is determined that the gender setting is satisfied. If the gender setting is not satisfied (step e7: No), the process control proceeds to step e17.

At step e9, the feature determining unit 183 then performs the process to assume the age in accordance with the detection result of the detected face and each facial part. For example, in the example of the correction-condition setting screen illustrated in FIG. 3, if the detected faces include a face whose age is assumed to be in its thirties, it is determined that the age setting is satisfied. If the age setting is satisfied (step e9: Yes), the process control proceeds to step e11. If the age setting is not set as the correction condition, the process control proceeds to step e11. It is possible to have a configuration such that, if all of the detected faces satisfy the age setting, it is determined that the age setting is satisfied. If the age setting is not satisfied (step e9: No), the process control proceeds to step e17. For example, United States Patent Publication No. 2004/0228528 is available as the process to assume the age.

At step e11, the expression determining unit 183c then calculates the degree of smile in the expression in accordance with the detection result of the detected face and each facial part and determines that the face whose degree of smile is equal to or larger than a preset reference value is a smile. If the detected faces include a face that is determined to be a smile, it is determined that the smile setting is satisfied. If the smile setting is satisfied (step e11: Yes), the process control proceeds to step e13. If the smile setting is not set as the correction condition, the process control proceeds to step e13. It is possible to have a configuration such that, if all of the detected faces satisfy the smile setting, it is determined that the smile setting is satisfied. If the smile setting is not satisfied (step e11: No), the process control proceeds to step e17.

At step e13, the face selecting unit 185 then selects a face that satisfies all of the set correction conditions as a correction target. The face-image processing unit 187 then performs a first correction process on the face of the correction target (step e15), and the face correction process is terminated (the process control proceeds to step b11 illustrated in FIG. 5 or step c23 illustrated in FIG. 6).

On the other hand, if any of the set correction conditions is not satisfied and the process control proceeds to step e17, the face selecting unit 185 selects all of the detected faces as the correction target. The face-image processing unit 187 then performs a second correction process on the faces of the correction targets (step e19), and the face correction process is terminated (the process control proceeds to step b11 illustrated in FIG. 5 or step c23 illustrated in FIG. 6).

An explanation will be given of the first correction process performed if all of the set correction conditions are satisfied and the second correction process performed if any of the correction conditions is not satisfied. FIG. 9 is a diagram that explains the contents of the first correction process and the second correction process. For example, in the first embodiment, as illustrated in a record R11, three types of correction processes, i.e., a correction process A (smoothing process), a correction process B (glazing process), and a correction process C (whitening process) are performed in combination as the first correction process. On the other hand, for example, as illustrated in a record R13, the correction process A (smoothing process) is performed as the second correction process (1).

Thus, in the first embodiment, if a face that satisfies all of the set correction conditions is present in the live-view image or the shot image, a plurality of correction processes can be performed in combination on the face. If no face that satisfies all of the set correction conditions is present in the live-view image or the shot image, one correction process can be equally performed on all of the detected faces.

One correction process can be performed as the first correction process. Furthermore, the combination of two or more correction processes is not limited to the exemplified one and can be used as appropriately selected.

Moreover, as illustrated as a record R15 in FIG. 9, it is possible to have a configuration such that the correction process is not performed as the second correction process (2). In such a case, the correction process is not performed on a face that does not satisfy the correction condition.

Figure 10:
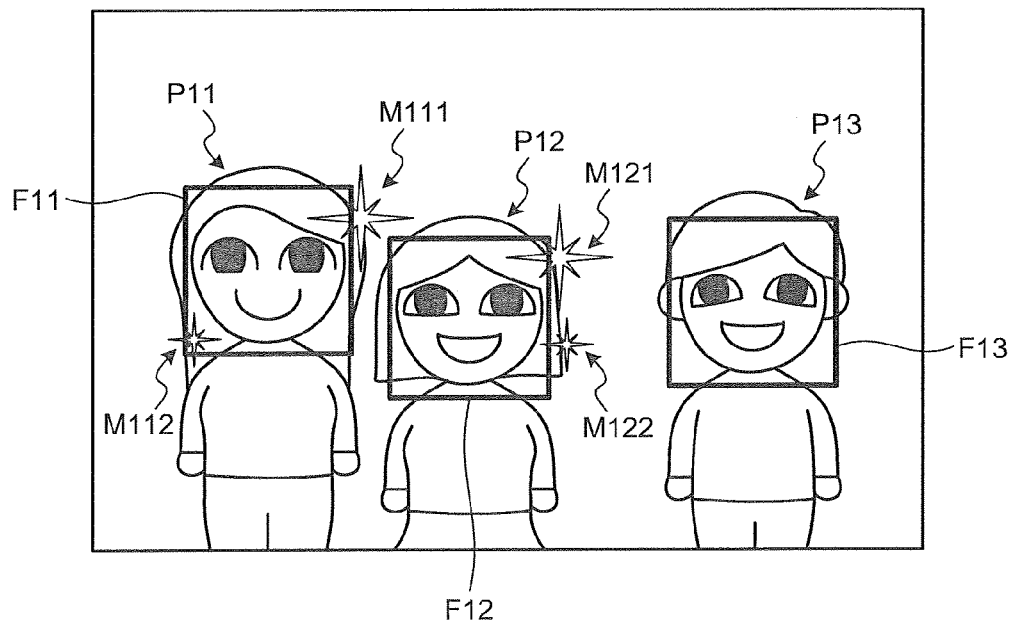
FIG. 10 is a diagram that illustrates a display example of a live-view image after the correction process.

FIG. 10 is a diagram that illustrates a display example of the live-view image after the correction process displayed on the display unit 23 at step b13 illustrated in FIG. 5. Two persons P11 and P12, who are women, and one person P13, who is a man, appear on the live-view image illustrated in FIG. 10, and focus marks F11, F12, and F13 that indicate the faces of the persons P11, P12, and P13 are displayed. It is assumed that the number-of-people setting (three) and the gender setting (female gender) are set as the correction conditions. In this case, by the face correction process illustrated in FIG. 8, each of the faces of the persons P11 and P12 is selected as the correction target, the correction process is performed on each of the faces, and the live-view image in which the correction process has been performed on the faces of the persons P11 and P12 is displayed on the display unit 23. Although the image in a state where the correction process has been performed is not illustrated as the faces of the persons P11 and P12 in FIG. 10, the live-view image in which the correction process has been performed on the faces is actually displayed.

At that time, templates M111 and M112 are superimposed and displayed at a position near the face of the person P11 selected as the correction target. In the same manner, templates M121 and M122 are superimposed and displayed at a position near the face of the person P12 selected as the correction target.

In this manner, a correction-processed image (finished image) with respect to the face of the correction target can be displayed on the live-view image for the user. Furthermore, the templates are displayed so that the face of the correction target in the live-view image can be displayed in a recognizable manner.

Figure 11:
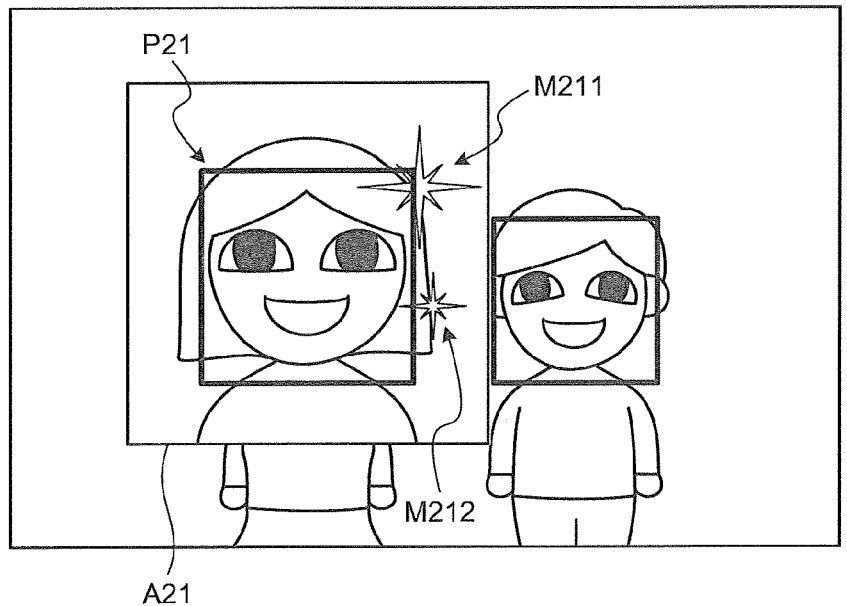
FIG. 11 is a diagram that illustrates a different display example of the live-view image after the correction process.

FIG. 11 is a diagram that illustrates a different display example of the live-view image after the correction process. An example is illustrated in FIG. 11 in which a partial image A21 that includes the face of the correction target is displayed on the live-view image with an enlargement process performed on the partial image A21, and templates M211 and M212 are superimposed and displayed at a position near the face of the person P21 of the correction target on the partial image A21. In this manner, it is possible to display the finished image of the correction process performed on the face of the correction target on the live-view image in a more visible manner.

Although an explanation is given of the live-view image, the same screen display as those in FIGS. 10 and 11 can be performed in the case where the shot image after the correction process is displayed as the confirmation image at step c23 illustrated in FIG. 6.

As described above, according to the first embodiment, if the correction mode to correct the face in the shot image is set as the setting relating to the shooting mode, it is possible to detect the number of detected faces in accordance with the face detection result in the live-view image or the shot image by the part-of-face detecting unit 19 and determine the features of the face. Then, it is possible to select a face that satisfies the correction conditions set in advance in accordance with the user operation as the correction target on the basis of the number of detected faces and the determined features of the face and perform the correction process on the selected face of the correction target. Therefore, the correction process can be performed on a face that satisfies the set correction conditions in a limited way instead of performing the correction process on all of the detected faces so that the processing time required for the correction process can be shortened.

In the above-described first embodiment, the first correction process is performed on the face that satisfies all of the set correction conditions. On the other hand, it is possible to have a configuration such that the correction process is performed if any one of the set correction conditions is satisfied. Furthermore, it is possible to have a configuration such that a correction process is defined in advance in association with each correction condition and the correction process associated with the satisfied correction condition is performed.

FIG. 12 is a diagram that illustrates examples of the correction processes set for each correction condition. As illustrated in FIG. 12, a correction process is set for each preliminarily assumed correction condition. The correction process corresponding to the satisfied correction condition is selectively performed on each detected face. For example, it is assumed that the gender setting (female gender) and the smile setting are set as the correction conditions. Moreover, it is assumed that two faces are detected in the live-view image or the shot image: one of the faces satisfies the gender setting, and the other one of the faces satisfies the smile setting. In this case, as illustrated by the record R21 in FIG. 12, the correction process A that is the smoothing process in association with the gender setting, the correction process B that is the glazing process, the correction process C that is the whitening process, and the correction process E that is the process to enlarge the eyes are performed on the one of the faces. Furthermore, as illustrated by the record R23, the correction process D that is the process to whiten the teeth in association with the smile setting is performed on the other one of the faces.

Moreover, according to the above-described first embodiment, the first correction process is performed on a face that satisfies the set correction conditions and, if no face that satisfies all of the set correction conditions is present, the second correction process is performed on all of the faces detected in the live-view image or the shot image. It is possible to perform the first correction process on all of the faces detected in the live-view image or the shot image. Then, it is possible to have a configuration such that the second correction process rather than the first correction process is performed on a face that satisfies the set correction conditions. For example, the correction process A (smoothing process) illustrated in FIG. 9 is performed as the first correction process on all of the faces detected in the live-view image or the shot image. Then, it is possible to further perform the correction process B (glazing process) and the correction process C (whitening process) as the second correction process on a face that satisfies the set correction condition.

Each of the correction conditions, such as the number-of-people setting, the face-size setting, the gender setting, the age setting, and the smile setting, to select the face of the correction target can be not only set (selected) in accordance with the user operation but also fixedly set in advance.

FIG. 13 is a block diagram that illustrates the system configuration of a digital camera 1b according to a second embodiment. The same components as those of the first embodiment are indicated with the same reference numerals. As illustrated in FIG. 13, the digital camera 1b includes the imaging element 11, the lens system unit 12, the lens drive circuit 13, the imaging circuit 14, the SDRAM 15, the AE unit 16, the AF unit 17, an image processing unit 18b, the part-of-face detecting unit 19, a face registration unit 20b, a CPU 21b, the embedded memory 22, the display unit 23, the display drive circuit 24, the communication I/F 25, the operation unit 26, the removable memory 27, the power circuit 28, and the battery 29.

In the second embodiment, the image processing unit 18b includes a person recognizing unit 189b, a face selecting unit 185b, and a face-image processing unit 187b. The person recognizing unit 189b checks the face area in the live-view image or the shot image against a face image registered in the face registration unit 20b and recognizes (identifies) whether it is the face of a specific person, thereby determining the features of the face in the live-view image or the shot image. For example, the person recognizing unit 189b compares the face area detected from the live-view image or the shot image by the face detecting unit 191 of the part-of-face detecting unit 19 with the face image registered in the face registration unit 20b, thereby calculating the degree of similarity. If a face image with a high degree of similarity is present, the person recognizing unit 189b outputs the person's ID as a recognition result.

The face selecting unit 185b selects the face of a specific person included in the live-view image or the shot image as the correction target in accordance with the recognition result by the person recognizing unit 189b. The face-image processing unit 187b performs a predetermined correction process on the face in the live-view image or the shot image selected by the face selecting unit 185b as the face of the registered person.

For example, the face registration unit 20b is a data table in which image data (face data) on the actually shot face of a person is registered (stored) in association with the person's ID that is uniquely assigned to the person, and the face image is registered as needed in accordance with a registration operation by the user.

The CPU 21b includes a face-registration processing unit 213b. The face-registration processing unit 213b receives a registration operation of a person by the user via the operation unit 26. For example, a process is performed such that a registration menu of a face is displayed as one of setting menus displayed when the menu switch 5 is pressed and notification of a registration request of a face image is displayed on the display unit 23 in response to a selection operation of the registration menu. The face-registration processing unit 213b then performs the process to store the face image of the person for which the registration has been instructed in response to the notification of the registration request in the face registration unit 20b. For example, the user shoots a person to be registered in advance and performs a registration operation of the person by designating the shot image. If the registered face is included in the live-view image or the shot image, the face selecting unit 185b of the image processing unit 18b selects the face as the correction target.

In this example, the registration of the person is performed by designating the shot image of the person to be registered. On the other hand, for example, if the digital camera 1b has a configuration such that it includes, as the operation unit 26, a touch panel integrally formed with the whole area or part of the screen of the display unit 23, the registration can be performed in a manner described below. Specifically, it is possible to have a configuration such that, in accordance with a touch operation for a person who appears in the live-view image or the shot image, the image of the face area of the person for which the touch operation has been performed is registered in the face registration unit 20b as the face image of the registered person.

Figure 14:
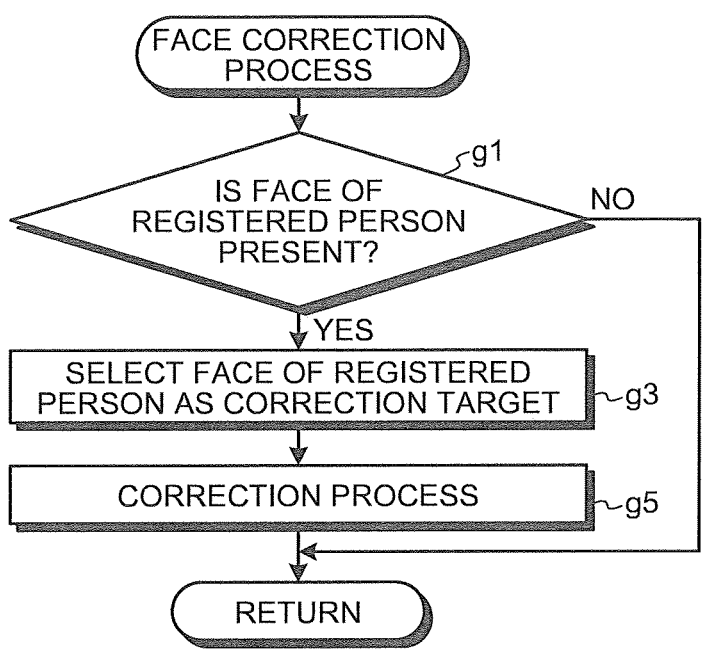
FIG. 14 is a flowchart that illustrates the detailed procedure of a face correction process according to the second embodiment.

FIG. 14 is a flowchart that illustrates the detailed procedure of the face correction process according to the second embodiment. As illustrated in FIG. 14, in the face correction process according to the second embodiment, first, the person recognizing unit 189*b* determines whether the face of the registered person is included in the detected faces by referring to the face images registered in the face registration unit 20*b* in accordance with the face detection result performed on the live-view image or the face detection result performed on the shot image. If the face of the registered person is not included (step g1: No), the face correction process is terminated.

If the face of the registered person is included in the live-view image or the shot image (step g1: Yes), the face selecting unit 185*b* selects the face of the registered person as the correction target (step g3). The face-image processing unit 187*b* then performs the correction process on the face of the correction target (step g5), and the face correction process is terminated.

In the same manner as the first embodiment, it is possible to have a configuration such that, if the face of the registered person is present in the live-view image or the shot image, the first correction process is performed on the face and, if the face of the registered person is not present, the second correction process is performed on all of the detected faces. Furthermore, it is possible to have a configuration such that the contents of the correction process to be performed on the face can be individually set in association with the registered person. For example, upon the registration operation of the person, the selection operation of the correction process to be performed on the face is also received and stored in, for example, the face registration unit 20*b*, the embedded memory 22, or the like, in association with the person's ID. In this manner, it is possible to selectively perform the designated correction process on the face of the detected registered person.

The live-view image in which the correction process has been performed on the face in the face correction process is displayed on the display unit 23 in a state where the correction mark is superimposed and displayed at a position near the face in the same manner as the first embodiment. Furthermore, the shot image in which the correction process has been performed on the face in the face correction process is displayed on the display unit 23 as a confirmation image for the user.

As described above, according to the second embodiment, a predetermined face that is desired to be a correction target can be registered as a registered person. Then, the correction process can be performed on the face of the registered person who has been registered in advance by the user. Therefore, the correction process can be performed on only the face of the specific person intended by the user and the processing time required for the correction process can be shortened.

In each of the above-described embodiments, an explanation is given of the case where the correction process is performed on a face that satisfies the correction conditions in the live-view image or the shot image. It is possible to have a configuration such that the correction process is not performed on the face in the live-view image. However, it is possible to have a configuration to perform the process of superimposing and displaying the correction mark at the position near the face that satisfies the set correction conditions. Thus, the face that is the correction target upon the shooting can be displayed for the user on the live-view image.

Part or all of the process performed by the CPUs 21 and 21*b* as described above in each of the embodiments can be implemented by hardware. Although an explanation is given of the configuration in which the image processing units 18 and 18*b*, the part-of-face detecting unit 19 and the like are implemented by hardware, they can be implemented as software by executing a predetermined program.

Although an explanation is given with the digital camera as a specific example of the imaging apparatus in the above-described embodiments, the present invention is not limited to this and can be applied to a camera unit of a mobile phone or a camera unit attached to a PC. Although an explanation is given of the case where the correction process is performed by processing still image data, a target of the correction process is not limited to the still image data and the present invention can be applied to moving image data in the same manner.

According to the present invention, it is possible that the face that satisfies the correction conditions is selected in accordance with the number of faces detected in image data and the features of the faces and the correction process is performed on at least the selected face. Therefore, instead of performing the correction process on all of the detected faces, the correction process can be performed on the face that satisfies the correction conditions in a limited way; therefore, the processing time required for the correction process can be shortened.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
   a storage unit that stores data of a combination of correction processes set for each of a plurality of correction conditions, the correction conditions including a number of people detected in image data and a face size, a gender, an age, and a smile condition of the people detected in the image data, the correction processes including a smoothing process, a glazing process, a whitening process, a process to whiten teeth, and a process to enlarge eyes;
   an imaging unit that photoelectrically converts an object image, thereby generating image data;
   a face detecting unit that performs face detection in the image data generated by the imaging unit;
   a number-of-people detecting unit that detects the number of faces detected in the image data based on a face detection result by the face detecting unit;
   a read-out unit that reads out the correction conditions stored in the storage unit if one or more faces are detected;
   a feature determining unit that determines which correction conditions each of the one or more faces detected in the image data satisfies, based on the face detection result by the face detecting unit;
   a face selecting unit that selects from the one or more faces detected at least one face to be corrected based on a detection result by the number-of-people detecting unit and a determination result by the feature determining unit;
   a face-image processing unit that, based on the determination result by the feature determining unit, performs a correction process on the at least one face selected by the face selecting unit according to the data of the combination of the correction processes stored in the storage unit for the correction conditions satisfied by the at least one face selected by the face selecting unit; and
   a display processing unit that displays the image data in which a correction process is performed on a face by at least the face-image processing unit on a display unit, wherein a mark indicating a correction is displayed at a position near the face on which the correction process is performed and wherein data associated with the mark including a display position of the mark is stored as additional information of the image data in which the correction process is performed.

2. The imaging apparatus according to claim 1, wherein the feature determining unit determines a size of the detected face based on the shape of the detected face, and the face selecting unit selects a face for which it is determined that the detected face has a size equal to or larger than a predetermined size set in advance.

3. The imaging apparatus according to claim 1, wherein the feature determining unit includes a person recognizing unit that checks a face detected by the face detecting unit against face data on a registered person registered in advance, thereby recognizing a face of the registered person included in the image data, and the face selecting unit selects a face recognized as the registered person by the person recognizing unit.

4. An image processing method used in an imaging apparatus that includes a storage unit that stores data of a combination of correction processes set for each of a plurality of correction conditions, the correction conditions including a number of people detected in image data and a face size, a gender, an age, and a smile condition of the people detected in the image data, the correction processes including a smoothing process, a glazing process, a whitening process, a process to whiten teeth, and a process to enlarge eyes; and an imaging unit that photoelectrically converts an object image to generate image data, the image processing method comprising:
  performing face detection in the image data generated by the imaging unit;
  detecting the number of faces detected in the image data;
  reading-out the correction conditions stored in the storage unit if one or more faces are detected;
  determining which correction conditions each of the one or more faces detected in the image data satisfies;
  selecting from the one or more faces detected at least one face to be corrected based on the number of detected faces and the correction conditions determined to be satisfied;
  based on the correction conditions determined to be satisfied, performing a correction process on the at least one selected face according to the data of the combination of the correction processes stored in the storage unit for the correction conditions determined to be satisfied by the at least one selected face; and
  displaying the image data in which a correction process is performed on a face, wherein a mark indicating a correction is displayed at a position near the face on which the correction process is performed and wherein data associated with the mark including a display position of the mark is stored as additional information of the image data in which the correction process is performed.

* * * * *